US012808448B2

(12) United States Patent
Ebauer et al.

(10) Patent No.: US 12,808,448 B2
(45) Date of Patent: Nov. 24, 2026

(54) SECURING ELEMENT

(71) Applicant: Georg Fischer Rohrleitungssysteme AG, Schaffhausen (CH)

(72) Inventors: Alexander Ebauer, Schaffhausen (CH); Eva Stoll, Klettgau (DE); Bürgi Stefan, Schaffhausen (CH); Timo Jaeckle, Hilzingen (DE); Dejan Mitrovic, Hüfingen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 0 days.

(21) Appl. No.: 19/068,274

(22) Filed: Mar. 3, 2025

(65) Prior Publication Data

US 2025/0283549 A1 Sep. 11, 2025

(30) Foreign Application Priority Data

Mar. 5, 2024 (EP) .................................... 24161298

(51) Int. Cl.
*F16K 27/00* (2006.01)
*F16B 5/06* (2006.01)
*F16B 39/32* (2006.01)
*F16K 35/04* (2006.01)

(52) U.S. Cl.
CPC ................ *F16K 27/00* (2013.01); *F16B 5/06* (2013.01); *F16B 39/32* (2013.01); *F16K 35/04* (2013.01)

(58) Field of Classification Search
CPC ............. F16K 27/00; F16B 5/06; F16B 39/32
See application file for complete search history.

(56) References Cited

U.S. PATENT DOCUMENTS 4,577,831 A * 3/1986 DiBartolo ............... F16K 35/02 251/114
4,616,856 A * 10/1986 Kowalyshen ......... F16B 21/088 285/92

(Continued)

FOREIGN PATENT DOCUMENTS

DE 10-2022-104172 A1 8/2023
EP 2264344 A1 12/2010

*Primary Examiner* — Kelsey E Cary
(74) *Attorney, Agent, or Firm* — Harness, Dickey & Pierce, P.L.C.

(57) ABSTRACT

Housing for a valve, preferably a valve in which the stroke for opening and closing takes place perpendicular to the flow direction of the valve, comprising an outer housing and an inner housing, wherein the outer housing and the inner housing can be screwed together, wherein the inner housing has a circumferential shoulder on the outer circumference and a securing element, wherein the securing element having a clamping and fastening region is formed as a one-piece, separate part, wherein the fastening region of the securing element is arranged in a form-fitting manner in a recess arranged below the shoulder on the outer circumference of the inner housing and the clamping region of the securing element protrudes beyond the shoulder and engages in the outer housing, wherein on the inner circumference of the outer housing a pocket is arranged into which the clamping region of the securing element snaps in the end position, wherein the clamping region has an outwardly directed flat clamping surface inclined to the perpendicularly running valve axis.

10 Claims, 3 Drawing Sheets

(56) References Cited

U.S. PATENT DOCUMENTS

| | | | | | |
|---|---|---|---|---|---|
| 4,845,819 | A * | 7/1989 | Kyomen | B29C 65/58 | |
| | | | | 403/360 | |
| 2012/0087763 | A1 * | 4/2012 | Hunnekuhl | F16K 27/0236 | |
| | | | | 411/81 | |

* cited by examiner

SECURING ELEMENT

CROSS-REFERENCE TO RELATED APPLICATIONS

The present application is based on, and claims priority from European Application Serial Number 24161298.5, filed Mar. 5, 2024, the disclosure of which is hereby incorporated by reference herein in its entirety.

FIELD OF THE INVENTION

The invention relates to a housing for a valve, preferably a valve in which the stroke for opening and closing takes place perpendicular to the flow direction of the valve, comprising an outer housing and an inner housing, wherein the outer housing and the inner housing can be screwed together, wherein the inner housing has a circumferential shoulder on the outer circumference and a securing element, wherein the securing element having a clamping and fastening region is formed as a one-piece, separate part, wherein the fastening region of the securing element is arranged in a form-fitting manner in a recess arranged below the shoulder on the outer circumference of the inner housing and the clamping region of the securing element protrudes beyond the shoulder and engages in the outer housing, wherein on the inner circumference of the outer housing a pocket is arranged into which the clamping region of the securing element snaps in the end position. By snapping the clamping region into the pocket, a click is performed, as a result of which acoustic feedback is provided that the outer housing is located in the desired end position.

BACKGROUND OF THE INVENTION

In pipeline construction, different housing parts are screwed together. For example, in a valve such as a diaphragm valve or a pressure reducing valve as well as other valves where the stroke for opening and closing is performed perpendicular to the flow direction of the valve.

The housing parts must be able to be opened during operation in order to be able to replace components therein.

The housing parts must be secured against loosening during operation of the valves.

EP 2 264 344 A1 discloses such a housing in which a securing element is used to secure the two housing parts to each other. The disadvantage of this is the toothing on the securing element and on the inner circumference of the outer housing, which is difficult to manufacture. Furthermore, the resistance of the locking and releasing of the toothing of the securing element in the outer housing when the outer housing is rotated, where there is already a high torque, is unnecessarily increased by the design of the central housing screw connection.

SUMMARY OF THE INVENTION

The object of the invention is to propose a housing which can be opened again with as little force as possible and is secured against unintentional loosening, as well as simple assembly with the guarantee that a specified end position is reached and economical production is enabled.

This object is achieved according to the invention in that the clamping region has an outwardly directed flat surface inclined to the perpendicularly running valve axis.

The housing according to the invention for a valve, preferably a valve in which the stroke for opening and closing is performed perpendicular to the flow direction of the valve, comprises an outer housing and an inner housing. Such housings are preferably used in diaphragm valves, pressure reducing valves and pressure retention valves. The outer housing, which has an internal thread, and the inner housing, which has an external thread, can be screwed together. The outer housing can be the upper part of the housing or the lower part of the housing, which also applies to the inner housing. The designation of the outer and inner housing depends on which part of the housing forms the nut and which forms the bolt of the threaded connection. The outer housing is therefore the one that protrudes beyond the inner housing in the connection region. The inner housing has a circumferential shoulder on the outer circumference. It is advantageous if the inner housing has an external thread and then the shoulder follows, where the diameter increases and the outer housing with the internal thread is limited in tightening by the shoulder.

A securing element is furthermore arranged on the housing according to the invention. The securing element has a clamping and fastening region. The securing element is formed as a one-piece, separate part. The securing element is arranged on the inner housing. The fastening region of the securing element is arranged in a form-fitting manner in a suitable recess below the shoulder on the outer circumference of the inner housing. The clamping region of the securing element protrudes beyond the shoulder and engages in the outer housing. The clamping region protrudes onto the inner circumference of the outer housing, wherein a pocket is arranged on the inner circumference of the outer housing, into which pocket the clamping region of the securing element snaps in the end position. The clamping region has an outwardly directed flat clamping surface that is inclined outwards in the radial direction relative to the perpendicularly running valve axis. Due to the clamping surface that runs inclined to the valve axis, the thickness of the clamping web increases in the radial direction starting from the fastening region, as a result of which a clamping effect and a locking in the pocket of the outer housing are generated and it is ensured that the housing is secured.

The pocket is preferably formed as a recess in the inner diameter. The width of the pocket preferably corresponds to the width of the clamping web so that it snaps into it and ensures a form-fitting connection to lock the outer housing. It is advantageous if a continuous window for detecting the securing element is arranged in the outer housing. The window is formed as a continuous opening in the wall of the outer housing in order to detect the securing element behind it in the end position. This serves as a visual check as to whether the securing element is latched-in and the housing is secured against unintentional loosening.

The window is preferably arranged in the region of the pocket. This ensures the detection of the securing elements if it engages in the pocket. The window is preferably formed to be smaller than the pocket.

It has been shown to be a preferred embodiment if the window is open towards the end face of the outer housing. As a result of this, the window has a U-shape that opens downwards. This embodiment is easy to manufacture.

The outer housing and the inner housing are preferably produced from plastic. It is advantageous if the securing element is made of plastic.

Of course, if necessary, several securing elements with recesses provided for this purpose can be arranged along the circumference.

It is advantageous if the inner circumference of the outer housing lying axially at the height of the clamping region is formed as a flat annular surface. Due to the present securing element, which engages into the pocket with the clamping region and thereby prevents the outer housing from loosening, there is no need for a toothing on the inner diameter of the outer housing.

It has been shown to be a preferred embodiment if the securing element has an outer edge in the transition between the fastening and clamping region, wherein the outer edge has a concavely running radius.

It has been shown to be a preferred embodiment if a touch element is arranged on the outer circumference of the outer housing for haptic checking of the arrangement of the securing element. The touch element is arranged axially in line with the securing element when the end position is reached. This means that it is possible to detect through touch whether the touch element and the securing element are also below one another and thus in the correct closing and securing position.

It is advantageous if a sliding contour is arranged at the upper end of the clamping surface so that the inner circumference of the outer housing slides over the sliding contour. This prevents the end face of the outer housing from coming into contact with an upper surface of the securing element that runs horizontally to the valve axis. It is advantageous if the sliding contour is formed as a slope, a radius, a curve or another contour that allows the inner diameter or the edge on the inner diameter of the outer housing to slide smoothly over it or prevents the end face of the outer housing from coming into blunt contact with a surface of the securing element that runs horizontally to the valve axis.

It has been shown to be a preferred embodiment if the inner edge of the inner circumference of the outer housing is formed as a sliding contour. The sliding contour can be formed as a slope, radius, curve or another shape that helps ensure that the end face of the outer housing does not come into contact with the clamping region of the securing element, but rather slides smoothly over the clamping surface.

All the configuration possibilities can be freely combined with each other.

BRIEF DESCRIPTION OF THE DRAWINGS

An exemplary embodiment of the invention is described on the basis of the figures, wherein the invention is not only limited to the exemplary embodiment. In the figures.

EXEMPLARY EMBODIMENTS

Figure 1:
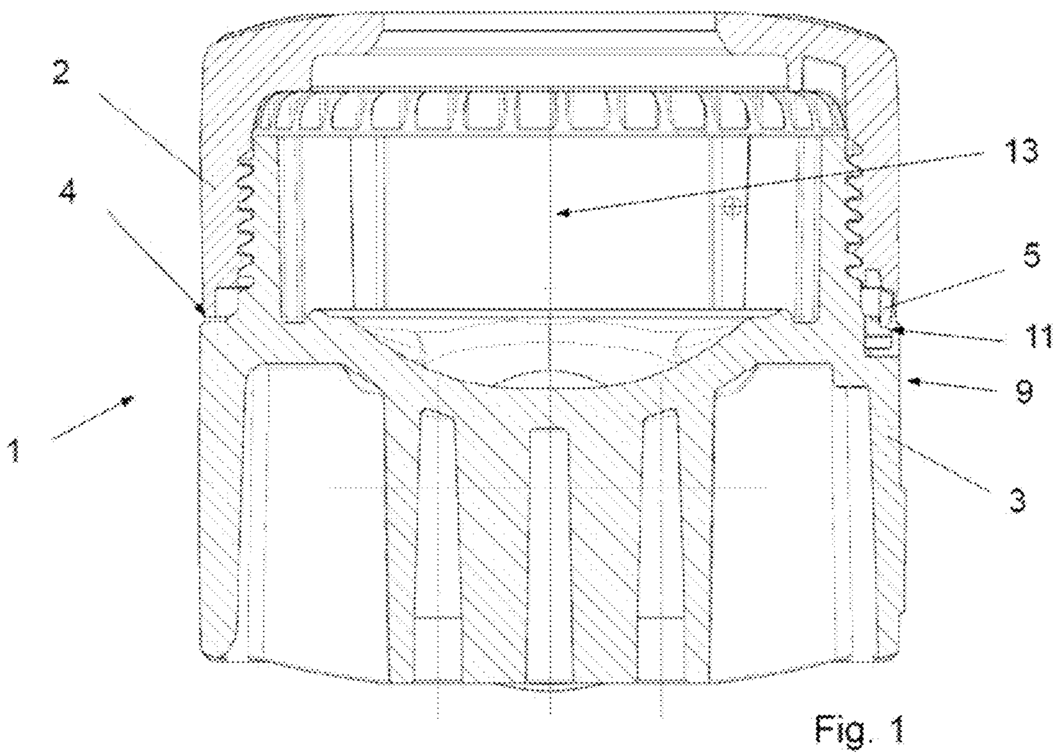
FIG. 1 shows a longitudinal section through a housing according to the invention.
Figure 2:
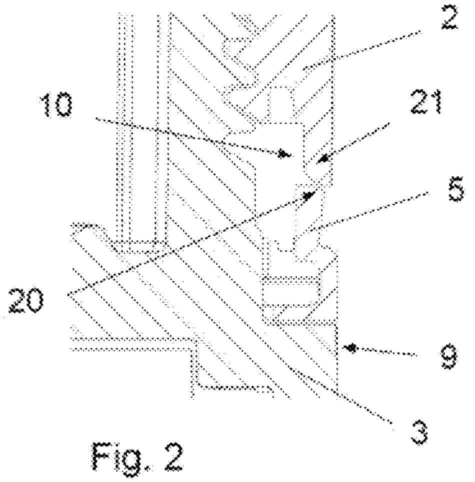
FIG. 2 shows a detailed view of a securing element in the case of a housing which has not yet been fully screwed in place.
Figure 3:
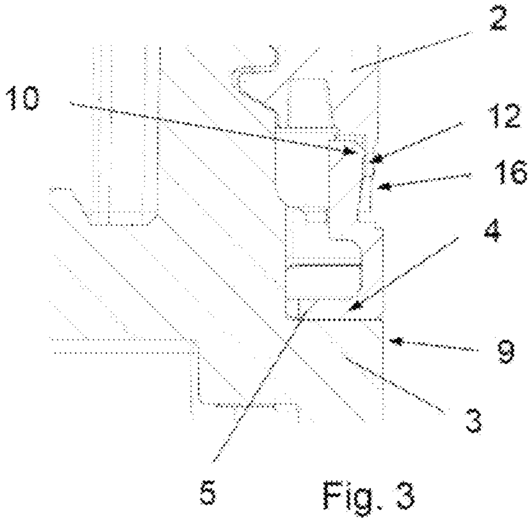
FIG. 3 shows a detailed view of a securing element in the case of a housing which has been screwed to the end position.
Figure 4:
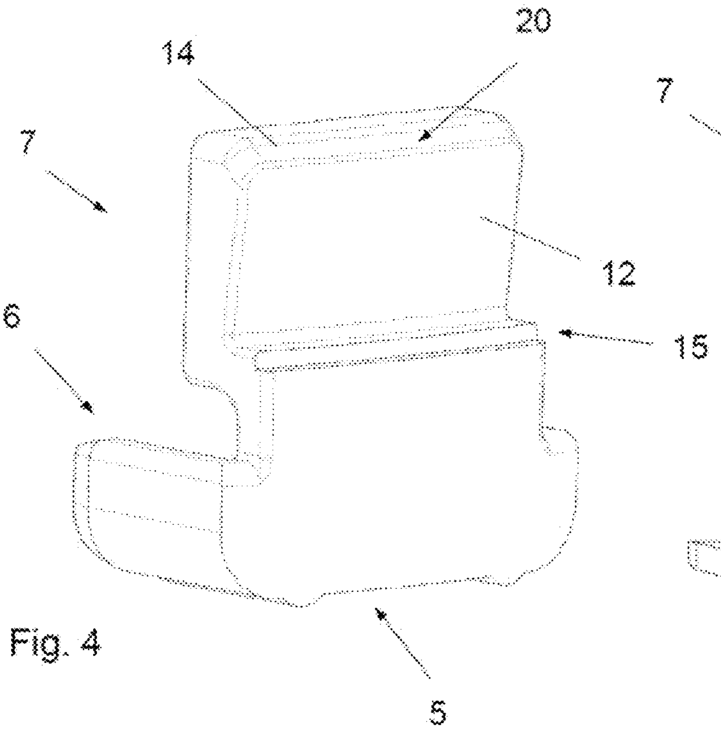
FIG. 4 shows a three-dimensional view of a securing element with lateral walls.
Figure 5:
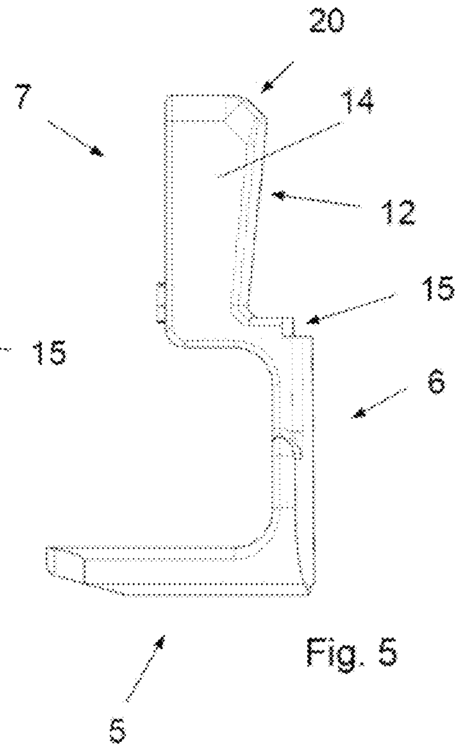
FIG. 5 shows a side view of a securing element without lateral walls.
Figure 6:
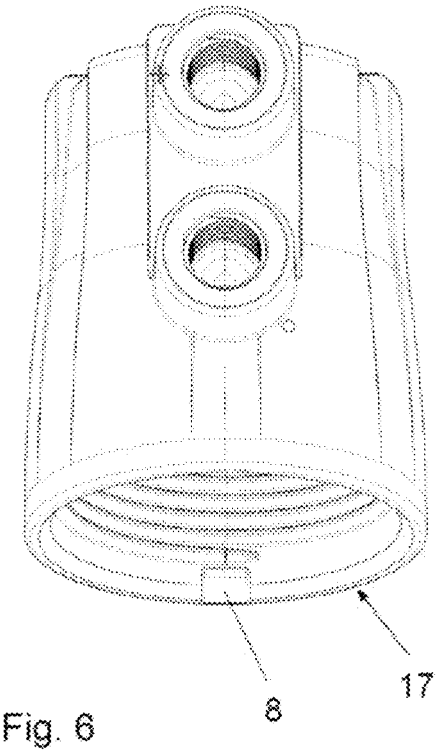
FIG. 6 shows a three-dimensional view of an outer housing.
Figure 7:
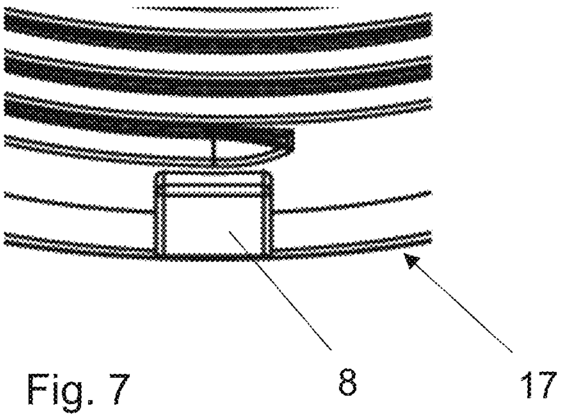
FIG. 7 shows a detailed view of the pocket on the inner diameter and FIGS. 8-10 show various embodiments of a securing element and its arrangement in the housing.
Figure 8:
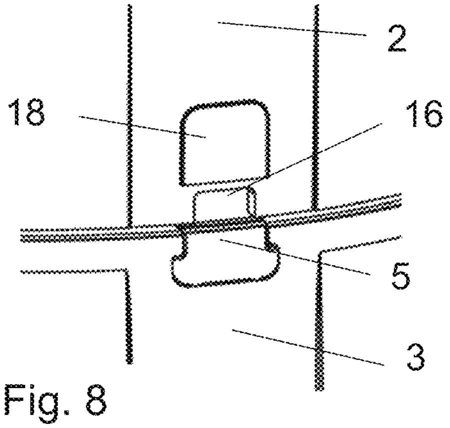
Figure 9:
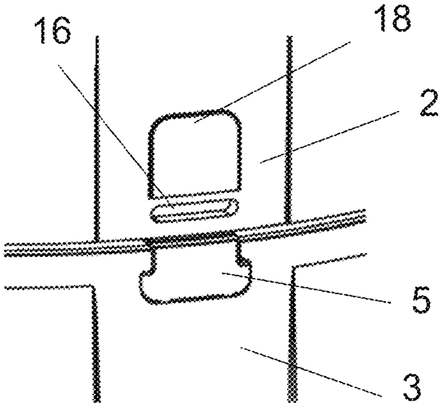
Figure 10:
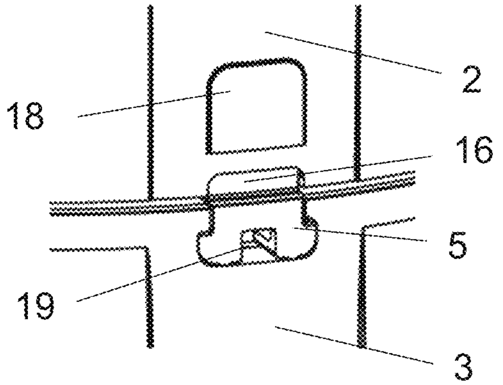

The drawing represented in FIG. 1 shows a housing 1 according to the invention for a valve. Wherein such housings 1 are preferably used for pressure retention, pressure regulating and diaphragm valves. This housing 1 is suitable for any valve in which the stroke for opening and closing is performed perpendicular to the flow direction of the valve. The housing 1 consists of an outer housing 2 and an inner housing 3, which can be screwed together. The outer housing 2 has an internal thread and forms the nut of the threaded connection and the inner housing 3 has an external thread and forms the bolt. In the embodiment represented, the upper part of the housing is represented as the outer housing 2 and the lower part of the housing as the inner housing 3. Of course, this can also be the other way around. On the outer circumference of the inner housing 3 below the shoulder 4, a recess 11 is arranged in which a securing element 5 is arranged. The securing element 5 has a fastening region 6 and a clamping region 7. The securing element 5 is formed as a separate part that is inserted into the recess 11 in a form-fitting manner in order to secure the outer housing 2 against unintentional loosening. The clamping region 7 of the securing element 5 protrudes beyond the shoulder 4 and engages in the outer housing 2. In FIGS. 2 and 3, it is clearly visible how the clamping region 7 protrudes beyond the shoulder 4. In addition, FIG. 3 clearly shows how the clamping region 7 and the clamping web 14 with its outwardly directed clamping surface 12 engages in the pocket 8 on the inner circumference 10 of the outer housing. It is also clearly visible from FIG. 2 that the clamping surface 12 runs at an angle to the valve axis 13 and when it engages in the pocket 8 on the inner circumference 10 of the outer housing 2, it is pressed straight, as a result of which the clamping and latching-in effect is implemented on the outer housing 2. It has been shown to be advantageous if the outwardly directed upper edge of the clamping surface 12 is formed as a sliding contour 20. This ensures that the end face of the outer housing 2 does not come into contact with an upper surface running horizontally to the valve axis 13, but glides smoothly over the sliding contour 20. A further advantage has been shown when the inner edge on the inner circumference 10 of the outer housing 2 also has a sliding contour 21, which further supports the process. FIGS. 4 and 5 show the one-piece securing element 5, preferably manufactured from plastic, represented separately. Wherein FIG. 4 shows an embodiment with laterally arranged walls and FIG. 5 shows an embodiment without such walls. An edge 15 runs between the fastening region 5 and the clamping region 7, which edge 15 has a concavely arranged radius (only represented schematically in FIGS. 4 and 5), which reduces local tension and prevents the clamping region 7 from breaking off from the fastening region 6. FIG. 6 shows a separate outer housing 2 in which the pocket 8, which is represented again in an enlarged form in FIG. 7, is shown. The pocket 8 is arranged axially at the outer end or lower edge region on the inner circumference 10 of the outer housing 2. The inner circumference 10 on the outer housing 2 at the axial height of the pocket 8 is formed as a flat annular surface. In order to visually ensure that the securing element 5 engages in the pocket 8 and the housing 1 is secured, the outer housing 1 preferably has a window 16 which allows the securing element 5 behind it to be seen. FIGS. 8 to 10 show alternative embodiments in the arrangement and configuration of the windows 16 and the securing elements 5. FIG. 8 shows an embodiment in which the window 16 is continuously open towards the end face 17 of the outer housing; the window 16 forms a U-shaped clearance. The window 16, regardless of the embodiment, if a window is present, it is always arranged in the region of the pocket 8 because that is where the clamping region 7 of the securing element 5 is present. FIG. 9 shows an embodiment of the window 16 in which the outer housing 2 completely surrounds the window 16. A further detection element as to whether the securing element 5 is correctly present on the housing and is performing its function is the arrangement of a touch element 18. This allows the installer, if a view of the securing element 5 is not ensured, to detect via touch as to whether the securing element 5 is aligned with the touch element 18. As a possible embodiment, the securing element 5 has a radially running recess 19 in the fastening region. This makes it easier to lever out the securing element 5 by means of a screwdriver to open the housing 1. In FIG. 10, the securing element 5 has a recess 19 so that it can be levered out with a tool before opening the housing 1.

The invention claimed is:

1. A housing comprising a valve, the valve having a stroke for opening and closing takes place along an axis perpendicular to a flow direction of the valve, the housing having an outer housing and an inner housing, wherein the outer housing and the inner housing can be screwed together, wherein the inner housing has a circumferential shoulder on an outer circumference and a securing element, wherein the securing element having a clamping and fastening region is formed as a one-piece, separate part, wherein the fastening region of the securing element is arranged in a form-fitting manner in a recess arranged below the shoulder on the outer circumference of the inner housing and the clamping region of the securing element protrudes beyond the shoulder and engages in the outer housing, wherein on an inner circumference of the outer housing a pocket is arranged into which the clamping region of the securing element snaps in the end position, wherein in that the clamping region has an outwardly directed flat clamping surface inclined to the axis, and wherein the clamping region is resiliently biased outwardly to facilitate snapping of the clamping region into a complementary receiving surface in the pocket.

2. The housing according to claim 1, wherein a continuous window for detecting the securing element is arranged in the outer housing.

3. The housing according to claim 2, wherein the window is arranged in a region of the pocket.

4. The housing according to claim 2, wherein the window is open towards the end face of the outer housing.

5. The housing according to claim 1, wherein the outer housing and the inner housing are made of plastic.

6. The housing according to claim 1, wherein the inner circumference of the outer housing lying axially at a height of the clamping region is formed as a flat annular surface.

7. The housing according to claim 1, wherein the securing element has an outer edge in a transition between the fastening and clamping region, wherein the outer edge has a concavely running radius.

8. The housing according to claim 1, wherein a touch element is arranged on an outer circumference of the outer housing for haptic checking of an arrangement of the securing element.

9. The housing according to claim 1, wherein a sliding contour is arranged on an upper end of the clamping surface so that the inner circumference of the outer housing slides over the sliding contour.

10. The housing according to claim 1, wherein an inner edge of the inner circumference of the outer housing is formed as a sliding contour.

* * * * *